(12) United States Patent
Subbaiah et al.

(10) Patent No.: US 11,489,712 B1
(45) Date of Patent: Nov. 1, 2022

(54) SYSTEMS AND METHODS FOR EFFICIENT CONFIGURATION FILE MANAGEMENT AND DISTRIBUTION BY NETWORK MANAGEMENT SYSTEMS

(71) Applicant: Juniper Networks, inc., Sunnyvale, CA (US)

(72) Inventors: Polisetty Rama Subbaiah, Sunnyvale, CA (US); Pallavi Ganny Krishnamurthy, Sunnyvale, CA (US); Kamal Kumar Tiwari, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 223 days.

(21) Appl. No.: 16/846,278

(22) Filed: Apr. 11, 2020

(51) Int. Cl.
*H04L 41/0213* (2022.01)
*H04L 41/0859* (2022.01)
*H04L 41/0806* (2022.01)
*H04L 41/0813* (2022.01)

(52) U.S. Cl.
CPC ...... *H04L 41/0213* (2013.01); *H04L 41/0806* (2013.01); *H04L 41/0813* (2013.01); *H04L 41/0863* (2013.01)

(58) Field of Classification Search
CPC .................................................. H04L 41/0213
See application file for complete search history.

(56) References Cited

U.S. PATENT DOCUMENTS

| | | | | |
|---|---|---|---|---|
| 10,797,952 B1* | 10/2020 | Mills | ............... | H04L 41/0856 |
| 10,873,504 B1* | 12/2020 | Silversides | ......... | H04L 41/0806 |
| 2006/0007944 A1* | 1/2006 | Movassaghi | ........ | H04L 41/0813 |
| | | | | 370/401 |
| 2014/0068035 A1* | 3/2014 | Croy | ................... | H04L 41/0893 |
| | | | | 709/221 |
| 2014/0114914 A1* | 4/2014 | Gan | .................... | G06F 11/1469 |
| | | | | 707/684 |
| 2018/0316578 A1* | 11/2018 | Shen | ...................... | H04L 41/50 |
| 2019/0394088 A1* | 12/2019 | Narayanan | .......... | H04L 41/0813 |
| 2020/0050517 A1* | 2/2020 | Haque | ................. | H04L 41/0803 |

\* cited by examiner

*Primary Examiner* — Jeffrey R Swearingen
(74) *Attorney, Agent, or Firm* — FisherBroyles, LLP (57) ABSTRACT

A disclosed method may include (1) generating a configuration file that represents a specific configuration of a network device included in a network, (2) storing the configuration file that represents the specific configuration of the network device among a set of configuration files available via an NMS, (3) assigning to the configuration file via the NMS, a configuration identifier that uniquely identifies the configuration file among the set of configuration files available via the NMS, (4) receiving, via the NMS, a rollback request to restore the network device to the specific configuration based at least in part on the configuration identifier, and then in response to receiving the rollback request, (5) restoring the network device to the specific configuration based at least in part on the configuration file. Various other systems, methods, and computer-readable media are also disclosed.

20 Claims, 6 Drawing Sheets

Database
140

| CONFIGURATION IDENTIFIER | CONFIGURATION FILE | STORAGE LOCATION | CREATION TIME |
|---|---|---|---|
| re0-123456-60 | juniper.conf.0.gz | /config/juniper.conf.0.gz | 2019-10-17T03:51:54 |
| re0-123456-61 | juniper.conf.1.gz | /config/juniper.conf.1.gz | 2019-12-07T13:12:14 |
| re0-123456-62 | juniper.conf.2.gz | /config/juniper.conf.2.gz | 2020-01-09T14:35:42 |
| re0-123456-63 | juniper.conf.3.gz | /config/juniper.conf.3.gz | 2020-02-27T19:31:34 |
| re0-123456-64 | juniper.conf.4.gz | /config/juniper.conf.4.gz | 2020-03-12T02:45:51 |

SYSTEMS AND METHODS FOR EFFICIENT CONFIGURATION FILE MANAGEMENT AND DISTRIBUTION BY NETWORK MANAGEMENT SYSTEMS

BACKGROUND

The configurations of network devices (such as routers and/or switches) are often controlled and/or defined by configuration files. Network equipment vendors may update the configurations of such network devices for various reasons. For example, a network administrator or vendor may detect and/or identify a software bug and/or deficiency in the current configuration file installed on a network device. To fix this software bug and/or deficiency, the network administrator or vendor may develop and/or distribute an updated configuration file for installation on the network device.

Unfortunately, some updated configuration files may be unstable and/or include even more significant software bugs and/or deficiencies than the previous versions. As a result, network administrators or vendors may maintain and/or manage backup stores of applicable configuration files via Network Management Systems (NMSes). By doing so, these network administrators or vendors may be able to revert the updated configurations of unstable and/or deficient network devices to known stable versions maintained in the backup stores by the NMSes.

Conventional NMS technologies may implement complex and/or confusing management schemes that render the rollback process more difficult and/or error-prone than necessary. For example, a backup store may accommodate five (5) previous configuration files for a network device. In this example, prior to the most recent configuration update, the backup store may include and/or store "ConfigFileA" in rollback slot 5, "ConfigFileB" in rollback slot 4, "ConfigFileC" in rollback slot 3, "ConfigFileD" in rollback slot 2, and "ConfigFileE" in rollback slot 1. If the network administrator or vendor updates the configuration of the network device with "ConfigFileF", the NMS may prepare the backup store for "ConfigFileF" by discarding "ConfigFileA" from rollback slot 5, shifting the configuration files from rollback slots 1 through 4 into rollback slots 2 through 5, and/or storing "ConfigFileF" in rollback slot 1. As a result, after the configuration update, the backup store may include and/or store "ConfigFileB" in rollback slot 5, "ConfigFileC" in rollback slot 4, "ConfigFileD" in rollback slot 3, "ConfigFileE" in rollback slot 2, and "ConfigFileF" in rollback slot 1.

The instant disclosure, therefore, identifies and addresses a need for additional and improved systems and methods for efficient configuration file management and distribution by NMSes.

SUMMARY

As will be described in greater detail below, the instant disclosure generally relates to systems and methods for efficient configuration file management and distribution by NMSes. In one example, a method for accomplishing such a task may include (1) generating a configuration file that represents a specific configuration of a network device included in a network, (2) storing the configuration file that represents the specific configuration of the network device among a set of configuration files available via an NMS, (3) assigning, to the configuration file via the NMS, a configuration identifier that uniquely identifies the configuration file among the set of configuration files available via the NMS, (4) receiving, via the NMS, a rollback request to restore the network device to the specific configuration based at least in part on the configuration identifier assigned to the configuration file, and then in response to receiving the rollback request, (5) restoring the network device to the specific configuration based at least in part on the configuration file stored among the set of configuration files available via the NMS.

Similarly, a system that implements the above-identified method may include a physical processor configured to execute various modules stored in memory. In one example, this system may include and/or execute (1) a configuration module that generates a configuration file that represents a specific configuration of a network device included in a network, (2) a storage module that stores the configuration file that represents the specific configuration of the network device among a set of configuration files available via an NMS, (3) an assignment module that assigns, to the configuration file via the NMS, a configuration identifier that uniquely identifies the configuration file among the set of configuration files available via the NMS, (4) a receiving module that receives, via the NMS, a rollback request to restore the network device to the specific configuration based at least in part on the configuration identifier assigned to the configuration file, and (5) a restoration module that restores, in response to the rollback request, the network device to the specific configuration based at least in part on the configuration file stored among the set of configuration files available via the NMS.

Additionally or alternatively, a non-transitory computer-readable medium that implements the above-identified method may include one or more computer-executable instructions. When executed by at least one processor of a computing device, the computer-executable instructions may cause the computing device to (1) generate a configuration file that represents a specific configuration of a network device included in a network, (2) store the configuration file that represents the specific configuration of the network device among a set of configuration files available via an NMS, (3) assign, to the configuration file via the NMS, a configuration identifier that uniquely identifies the configuration file among the set of configuration files available via the NMS, (4) receive, via the NMS, a rollback request to restore the network device to the specific configuration based at least in part on the configuration identifier assigned to the configuration file, and then in response to receiving the rollback request, (5) restore the network device to the specific configuration based at least in part on the configuration file stored among the set of configuration files available via the NMS.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for efficient configuration file management and distribution by NMSes. In this context, an NMS may include and/or represent any type or form of system that monitors, maintains, and/or optimizes a network. An NMS may include and/or represent network software installed and/or implemented on a single device or distributed across multiple devices. Additionally or alternatively, an NMS may include and/or represent a combination of hardware and software. For example, an NMS may include and/or represent a stand-alone physical device that executes software for monitoring, maintaining, and/or optimizing various network devices within a network.

As will be explained in greater detail below, the various systems and methods described herein may include and/or involve an NMS that stores and/or maintains, within a backup store, configuration files that represent certain configurations of a network device. In some examples, the NMS may assign unique configuration identifiers to each of the configuration files stored and/or maintained in the backup store. In such examples, each configuration identifier may uniquely identify a specific configuration file stored and/or maintained by the NMS in the backup store. Accordingly, this identifier scheme may constitute and/or represent a static 1-to-1 mapping between the configuration identifiers and the configuration files.

To retrieve one of the configuration files from the NMS, the network device may provide the NMS with a rollback request that includes the configuration identifier corresponding to the configuration file at issue. In response, the NMS may use the configuration identifier included in the rollback request to search for the configuration file within the backup store. The NMS may then return the requested configuration file to the network device. Upon receiving the configuration file from the NMS, the network device may apply the configuration file to revert to a previous, trusted configuration.

Figure 1:
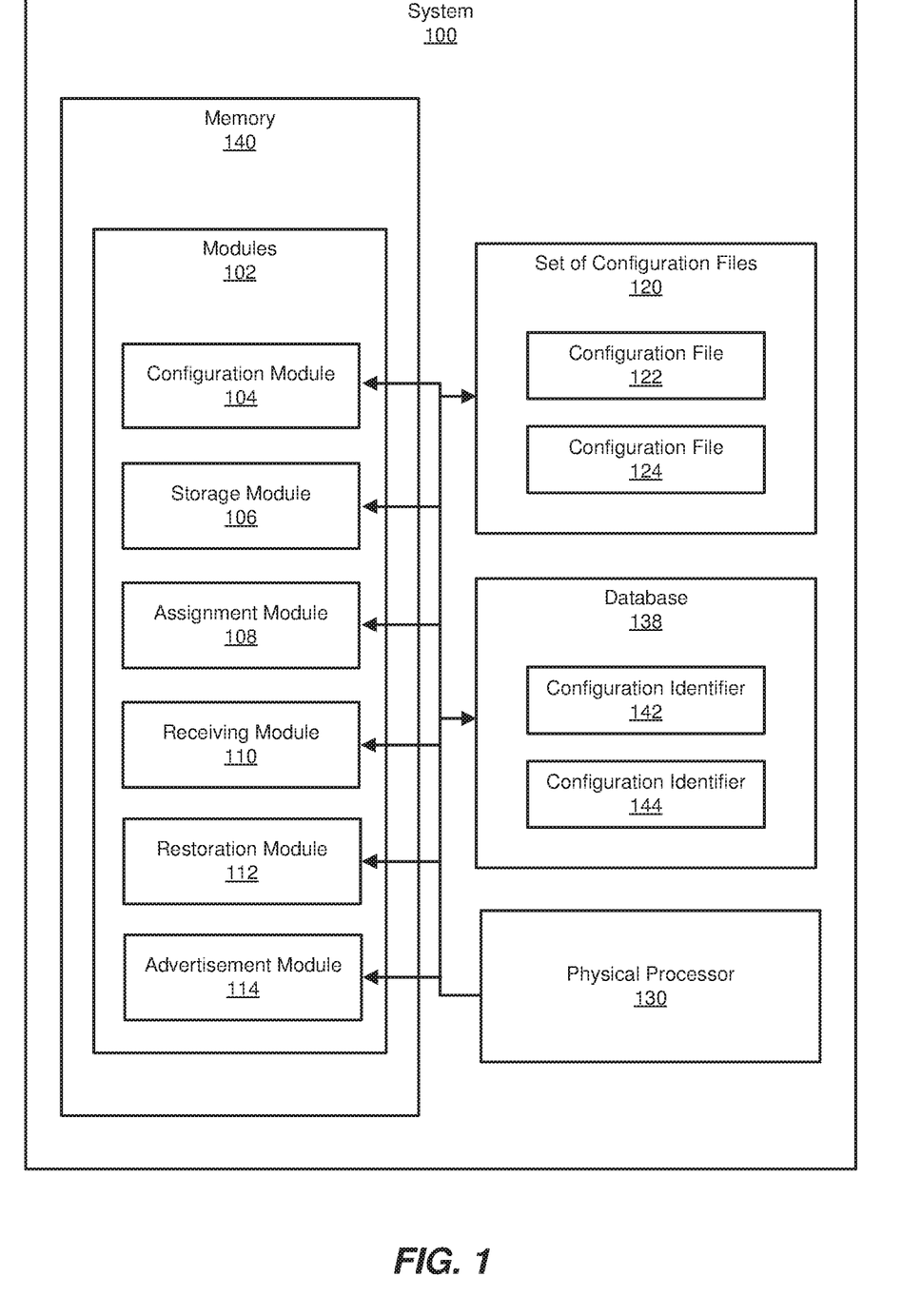
FIG. 1 is a block diagram of an exemplary system for efficient configuration file management and distribution by NMSes.
Figure 2:
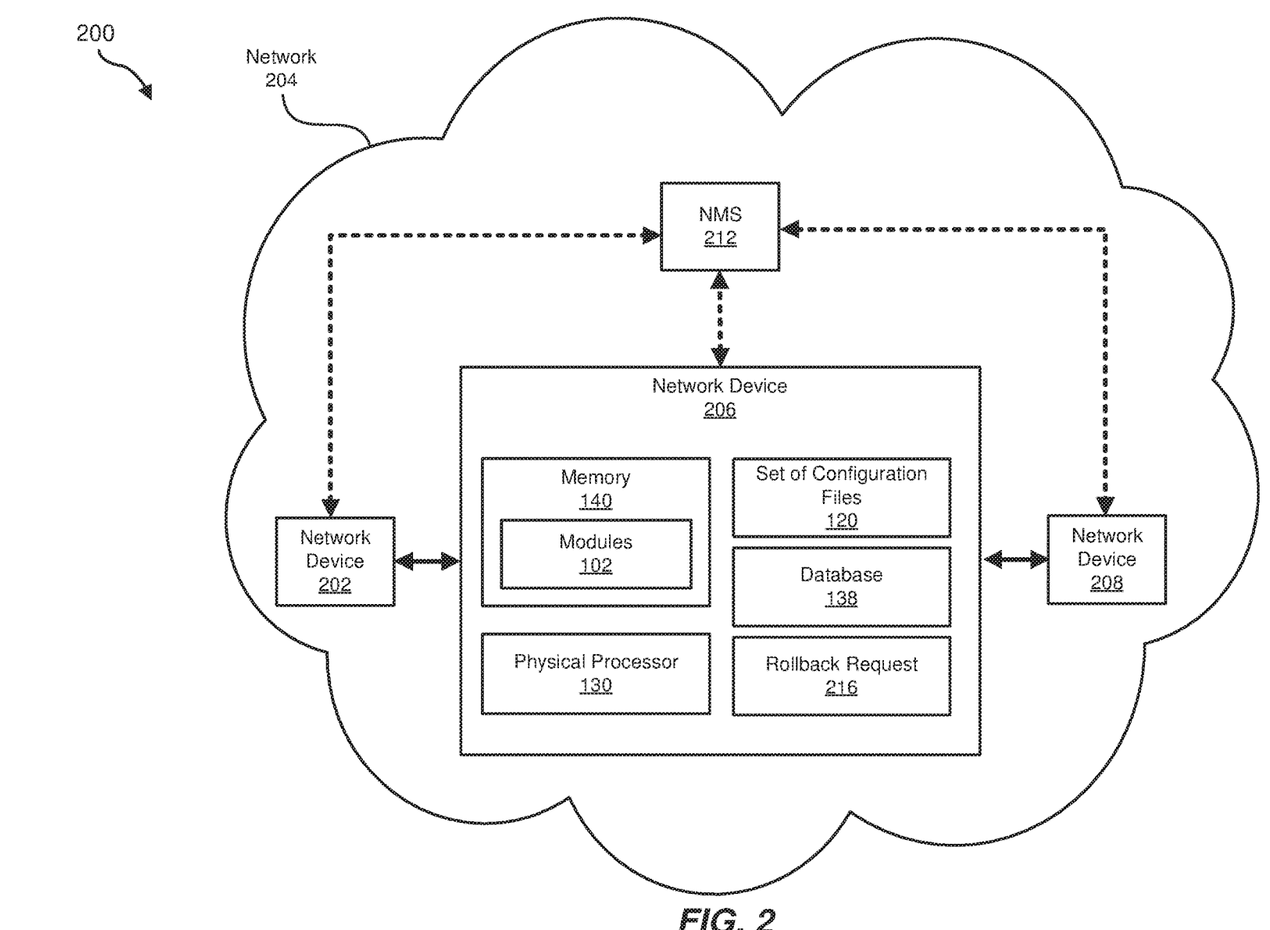
FIG. 2 is a block diagram of an additional exemplary system for efficient configuration file management and distribution by NMSes.
Figure 4:
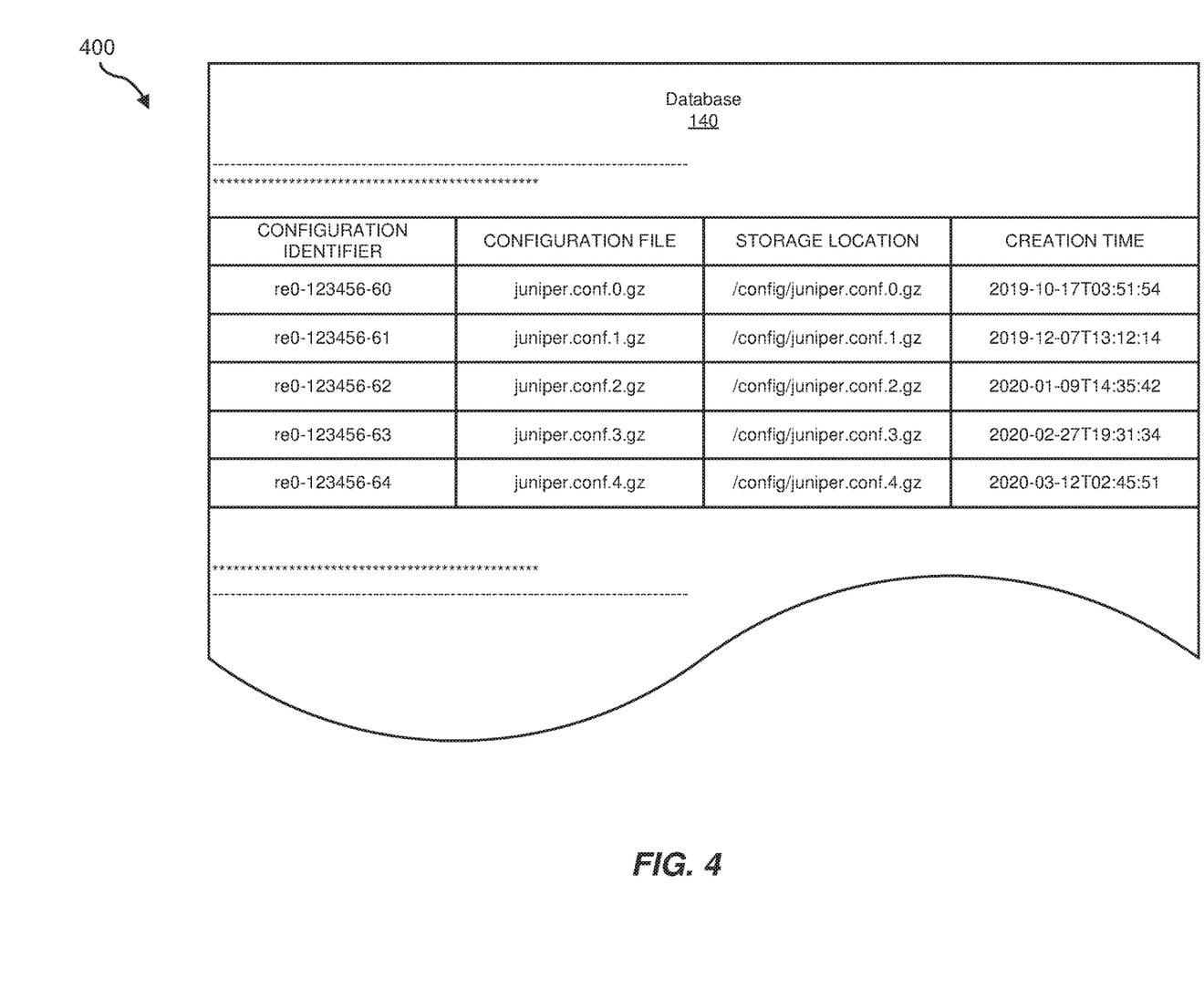
FIG. 4 is an illustration of an exemplary database that stores and/or maintains management information that facilitates efficiently managing and/or distributing configuration files.
Figure 5:
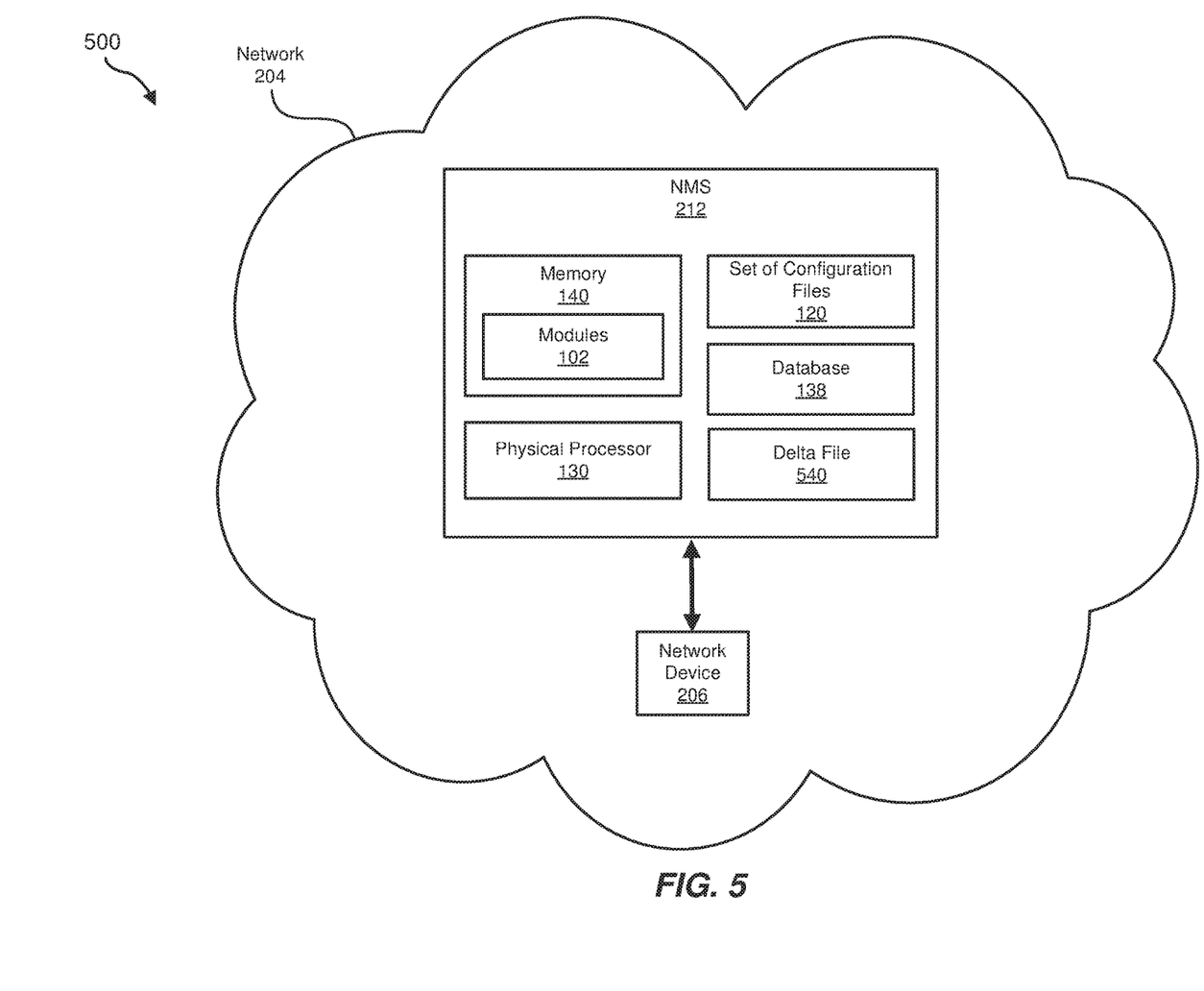
FIG. 5 is a block diagram of an additional exemplary system for efficient configuration file management and distribution by NMSes.

The following will provide, with reference to FIGS. 1, 2, and 5 detailed descriptions of exemplary systems and corresponding implementations for efficient configuration file management and distribution by NMSes. Detailed descriptions of an exemplary database will be provided in connection with FIG. 4. In addition, detailed descriptions of an exemplary computing system for carrying out these methods will be provided in connection with FIG. 6.

FIG. 1 shows an exemplary system 100 that facilitates efficient configuration file management and distribution by NMSes. As illustrated in FIG. 1, system 100 may include one or more modules 102 for performing one or more tasks. As will be explained in greater detail below, modules 102 may include a configuration module 104, a storage module 106, an assignment module 108, a receiving module 110, a restoration module 112, and an advertisement module 114. Although illustrated as separate elements, one or more of modules 102 in FIG. 1 may represent portions of a single module application, and/or operating system. For example, one or more of modules 102 may represent and/or be implemented as part of an NMS running on a single network device and/or distributed across a plurality of network devices. Additionally or alternatively, one or more of modules 102 may represent and/or be implemented as part of an NMS agent and/or client running on a network device whose configuration is backed up and/or restored.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network devices 202, 206, and 208 and/or NMS 212) and/or the devices illustrated in FIG. 5. One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate efficient configuration file management and distribution by NMSes. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include certain configuration files, such as set of configuration files 120. In some examples, set of configuration files 120 may include and/or represent a configuration file 122 and/or a configuration file 124. In one example, each configuration file may store, constitute, and/or represent a complete configuration of a network device at a specific time. In this example, each complete configuration may include and/or represent a collection of parameters settings, attributes, characteristics, keys, and/or provisioning data. Set of configuration files 120 may back up and/or preserve certain configurations that have been implemented on and/or applied to the network device during at least one point in time.

As illustrated in FIG. 1, exemplary system 100 may additionally include one or more databases, such as database 138. In some examples, database 138 may include and/or store a configuration identifier 142 and/or a configuration identifier 144. In one example, configuration identifier 142 may correspond to and/or represent configuration file 122, and/or configuration identifier 144 may correspond to and/or represent configuration file 124. In this example, each configuration identifier may be assigned to the corresponding configuration file by an NMS. As will be described in greater detail below, each configuration identifier may uniquely identify a specific configuration file in a static 1-to-1 mapping, thereby avoiding and/or eliminating any ambiguity in calling for and/or retrieving the proper file.

An apparatus for efficient configuration file management and distribution by NMSes. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among NMS 212 and network devices 202, 206, and/or 208.

As illustrated in FIG. 2, network 204 may include and/or represent various network devices that form and/or establish communication paths and/or segments. For example, network 204 may include and/or represent one or more segment routing paths. One of these paths may include and/or represent network devices 202, 206, and/or 208. In this example, network device 202 may represent and/or constitute the ingress of the segment routing path. Although not illustrated in this way in FIG. 2, network 204 and/or the segment routing path may include and/or represent one or more additional network devices.

In some examples, and as will be described in greater detail below, one or more of modules 102 may cause network device 206 and/or NMS 212 to (1) generate configuration file 122 that represents a specific configuration of network device 206, (2) store configuration file 122 among set of configuration files 120 available via NMS 212, (3) assign configuration identifier 142 that uniquely identifies configuration file 122 among set of configuration files 120 available via NMS 212, (4) receive a rollback request 216 to restore network device 206 to the specific configuration based at least in part on configuration identifier 142 assigned to configuration file 122, and then in response to receiving rollback request 216, (5) restore network device 206 to the specific configuration based at least in part on configuration file 122 stored among set of configuration files 120 available via NMS 212.

Network devices 202, 206, and 208 each generally represent any type or form of physical computing device capable of reading computer-executable instructions and/or handling network traffic. Examples of network devices 202, 206, and 208 include, without limitation, routers (such as provider edge routers, hub routers, spoke routers, autonomous system boundary routers, and/or area border routers), switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable network devices.

NMS 212 generally represents any type or form of system that monitors, maintains and/or optimizes a network. In one example, NMS 212 may include and/or represent network software installed and/or implemented on a single device (such as network device 206). In another example, NMS 212 may include and/or represent network software implemented on and/or distributed across a plurality of devices (such as network devices 202, 206, and/or 208). Additionally or alternatively, NMS 212 may include and/or represent a combination of hardware and software. For example, NMS 212 may include and/or represent a separate physical device that executes a software for monitoring, maintaining, and/or optimizing network devices 202, 206, and/or 208 within network 204.

Network 204 generally represents any medium or architecture capable of facilitating communication or data transfer. In some examples, network 204 may include other devices besides network devices 202, 206, and 208 that facilitate communication and/or form part of segment routing paths. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
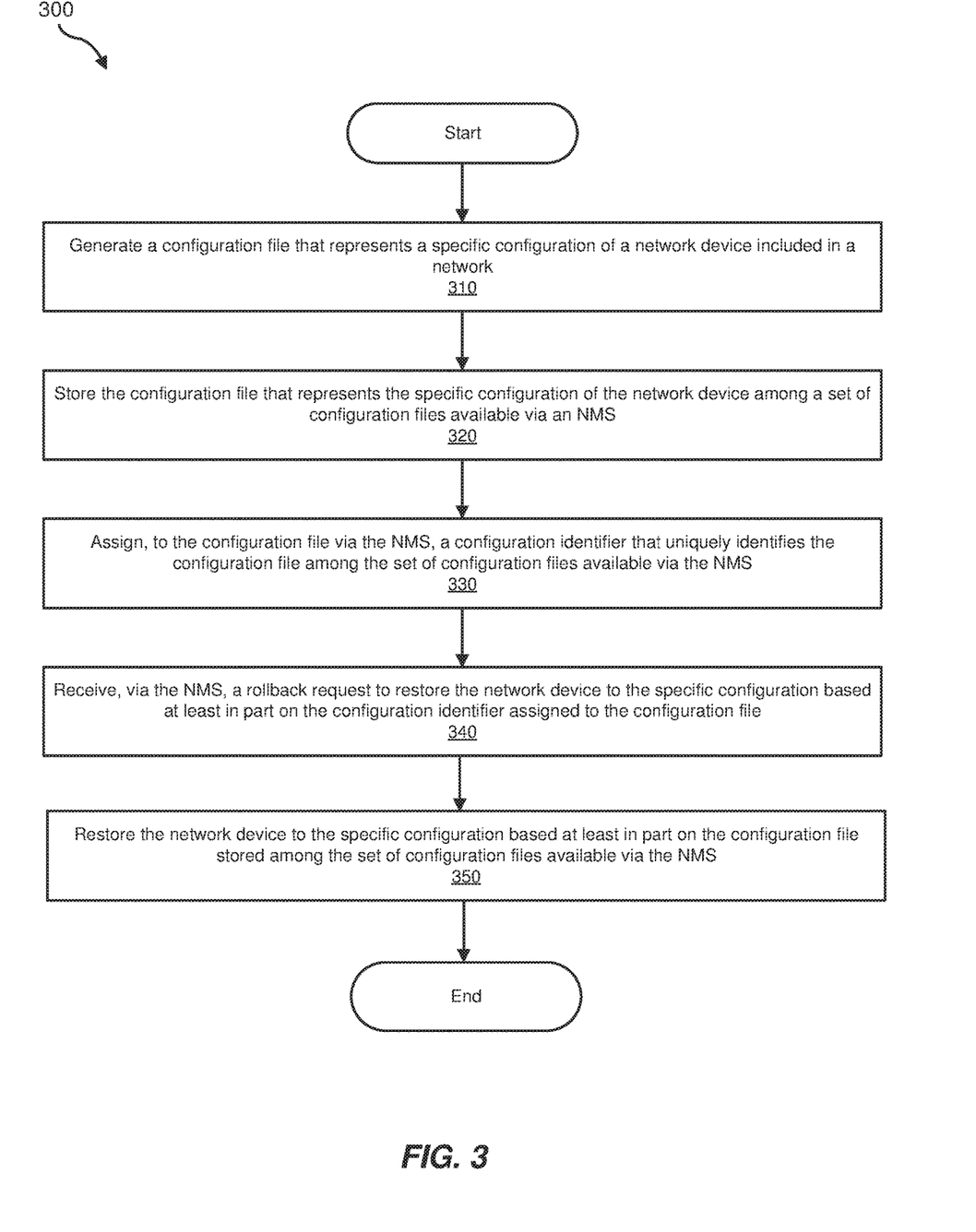
FIG. 3 is a flow diagram of an exemplary method for efficient configuration file management and distribution by NMSes.

FIG. 3 is a flow diagram of an exemplary computer-implemented method 300 for efficient configuration file management and distribution by NMSes. The steps shown in FIG. 3 may be performed by any suitable computer-executable code and/or computing system, including system 100 in FIG. 1, system 200 in FIG. 2, system 5 in FIG. 5, system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may generate a configuration file that represents a specific configuration of a network device included in a network. For example, configuration module 104 may, as part of network device 206 and/or NMS 212 in FIG. 2, generate configuration file 122 that represents a specific configuration of network device 206 included in network 204. In this example, configuration file 122 may include and/or represent a snapshot, a backup, and/or a copy of the specific configuration of network device 206 at a specific time. More specifically, configuration file 122 may represent and/or capture the current configuration of network device 206.

The systems described herein may perform step 310 in a variety of ways and/or contexts. In some examples, configuration module 104 may initiate the process of generating configuration files at regular intervals and/or on a periodic basis. In other examples, configuration module 104 may initiate the process of generating configuration files in response to any changes and/or modifications made to the configuration of network device 206. For example, when the configuration of network device 206 is updated, configuration module 104 may back up the updated configuration of network device 206 as configuration file 122.

In some examples, configuration module 104 may generate and/or produce configuration file 124 that represents a different configuration of network device 206 included in network 204. In this example configuration file 124 may include and/or represent a snapshot, a backup, and/or a copy of the specific configuration of network device 206 at a different time. More specifically, configuration file 124 may represent and/or capture a subsequent and/or later configuration of network device 206.

In some examples, configuration file 122 and/or 124 may each represent and/or capture the specific configurations of multiple network devices included in network 204. For example, configuration file 122 may include and/or represent a snapshot, a backup, and/or a copy of the specific configurations of network devices 202, 206, and 208 at a specific time. More specifically, configuration file 122 may represent and/or capture the current configurations of network devices 202, 206, and 208.

Returning to FIG. 3, at step 320 one or more of the systems described herein may store the configuration file that represents the specific configuration of the network device among a set of configuration files available via an NMS. For example, storage module 106 may, as part of network device 206 and/or NMS 212 in FIG. 2, store configuration file 122 among and/or within set of configuration files 120 available via NMS 212. Additionally or alternatively, storage module 106 may store configuration file 124 among and/or within set of configuration files 120 available via NMS 212. In this example, set of configuration files 120 may enable NMS 212 to restore a previous trusted and/or stable configuration to network device 206.

The systems described herein may perform step 320 in a variety of ways and/or contexts. In some examples, storage module 106 may back up and/or store configuration file 122 within a storage device on network device 206 and/or NMS 212. In one example, storage module 106 may back up and/or store configuration file 122 as part of database 138. Additionally or alternatively, storage module 106 may effectively copy configuration file 122 to database 138 for backup and/or storage purposes. In this example, configuration file 122 may be retrieved for restoration via NMS 212. As will be described in greater detail below, database 138 may be searchable via configuration identifiers that correspond to and/or represent specific configuration files.

Returning to FIG. 3, at step 330 one or more of the systems described herein may assign, to the configuration file via the NMS, a configuration identifier that uniquely identifies the configuration file among the set of configuration files available via the NMS. For example, assignment module 108 may, as part of network device 206 and/or NMS 212 in FIG. 2, assign configuration identifier 142 to configuration file 122. In this example, configuration identifier 142 may uniquely identify configuration file 122 in a static 1-to-1 mapping, thereby avoiding and/or eliminating any ambiguity in calling for and/or retrieving configuration file 122 from set of configuration files 120.

Similarly, assignment module 108 may assign configuration identifier 144 to configuration file 124. In this example, configuration identifier 144 may uniquely identify configuration file 122 in a static 1-to-1 mapping, thereby avoiding and/or eliminating any ambiguity in calling for and/or retrieving configuration file 124 from set of configuration files 120.

The systems described herein may perform step 330 in a variety of ways and/or contexts. In some examples, assignment module 108 may implement any type or form of identifier generation and/or assignment scheme. For example assignment module 108 may incorporate and/or insert, into configuration file 122, a portion of the date and/or time that configuration file 122 was generated and/or produced. Additionally or alternatively, assignment module 108 may begin assigning configuration identifiers to configuration files from a certain base and/or initial character string. Assignment module 108 may then increment the running character string each time a subsequent configuration identifier is assigned to a configuration file.

Configuration identifiers may include and/or incorporate any type or form of numbers, characters, and/or symbols capable of distinguishing one configuration file from another. In some examples, configuration identifiers may include and/or incorporate alphabetic letters, numbers, symbols, special characters, punctuation characters, kanji, variations or combinations of one or more of the same, and/or any other suitable characters.

In some examples, storage module 106 may store and/or maintain configuration identifiers 142 and 144 in database 138 to facilitate mapping configuration identifiers 142 and 144 to configuration files 122 and 124, respectively, and/or locating configuration files 122 and 124 based at least in part on configuration identifier 142, respectively. In one example, storage module 106 may store and/or maintain configuration files 122 and 124 alongside configuration identifiers 142 and 144, respectively, within database 138. Additionally or alternatively, storage module 106 may copy configuration files 122 and 124 for backup and/or storage alongside configuration identifiers 142 and 144, respectively, within database 138. In another example, storage module 106 may store and/or maintain configuration files 122 and 124 separately from configuration identifiers 142 and 144 outside database 138.

FIG. 4 illustrates an exemplary implementation of database 138. As illustrated in FIG. 4, database 138 may include and/or contain various data and/or information associated with set of configuration files 120. For example, database 138 may include and/or represent a table whose columns categorize different configurations by identifiers, files, storage locations, and/or creation time. In this example, configuration module 104 may generate and/or produce a configuration file (e.g., "juniper.conf.0.gz"). Storage module 106 may then store and/or maintain the "juniper.conf.0.gz" configuration file in database 138.

Continuing with this example, assignment module 108 may assign a configuration identifier (e.g., "re0-123456-60") to the "juniper.conf.0.gz" configuration file. Storage module 106 may then store and/or maintain the "re0-123456-60"

configuration identifier in database 138 in connection with the "juniper.conf.0.gz" configuration file. In one example, storage module 106 may also store and/or maintain a link and/or reference (e.g., "/config/juniper.conf.0.gz") to the storage location of the "juniper.conf.0.gz" configuration file in database 138. Additionally or alternatively, storage module 106 may store and/or maintain information (e.g., "2019-10-17T03:51:54") that identifies the creation time of the "juniper.conf.0.z" configuration file in database 138.

In some examples, the assignments of the configuration identifiers may remain static for as long as the corresponding configuration files are backed up and/or maintained by NMS 212. For example, the "re0-123456-60" configuration identifier may correspond to and/or represent the "juniper.conf.0.gz" configuration file for its entire duration and/or lifetime in database 138. Accordingly, the "re0-123456-60" configuration identifier may be assigned to the "juniper.conf.0.gz" configuration file when storage module 106 first stores that configuration file in database 138.

In addition, the "re0-123456-60" configuration identifier may continue representing the "juniper.conf.0.gz" configuration file until storage module 106 ultimately deletes and/or removes that configuration file from database 138. For example, the "re0-123456-60" configuration identifier may never correspond to and/or represent any of the "juniper.conf.1.gz", "juniper.conf.2.gz", "juniper.conf.3.gz", and/or "juniper.conf.4.gz" configuration files maintained in database 138. Likewise, the "re0-123456-61" configuration identifier may never correspond to and/or represent any of the "juniper.conf.0.gz", "juniper.conf.2.gz", "juniper.conf.3.gz", and/or "juniper.conf.4.gz" configuration files maintained in database 138. Accordingly, the addition of subsequent configuration files to database 138 may have no effect on the mapping between the "re0-123456-60" configuration identifier and the "juniper.conf.0.z" configuration file. By doing so, NMS 212 may be able to avoid the complex dynamic mapping scheme of conventional NMS technologies, which typically implement dynamic identifiers to reference specific configuration files.

To enable network device 206 to request and/or call for configuration file 122, one or more of the systems described herein may advertise configuration identifier 122 once it has been assigned to configuration file 122. For example, advertisement module 114 may advertise configuration identifier 142 to network device 206 in connection with configuration file 122. Additionally or alternatively, advertisement module 114 may advertise configuration identifier 142 to network device 202 and/or 208 in connection with configuration file 122. Similarly, advertisement module 114 may advertise configuration identifier 144 to network device 206 in connection with configuration file 124. Additionally or alternatively, advertisement module 114 may advertise configuration identifier 144 to network device 202 and/or 208 in connection with configuration file 124. The advertised configuration identifiers may be presented and/or provided to a network administrator responsible for network 204.

Returning to FIG. 3, at step 340 one or more of the systems described herein may receive, via the NMS, a rollback request to restore the network device to the specific configuration based at least in part on the configuration identifier assigned to the configuration file. For example, receiving module 110 may, as part of network device 206 and/or NMS 212 in FIG. 2, receive rollback request 216 to restore network device 206 to the specific configuration based at least in part on configuration identifier 142 assigned to configuration file 122. In this example, rollback request 216 may be generated and/or received after or at a time the specific configuration is no longer active. In other words, by the time rollback request 216 is received, the specific configuration represented by configuration file 122 may have already been replaced by a subsequent configuration. As a specific example, receiving module 110 may receive rollback request 216 for the "juniper.conf.0.gz" configuration file at a time when the "juniper.conf.4.gz" configuration file is active on network device 206.

The systems described herein may perform step 340 in a variety always and/or contexts. In some examples, receiving module 110 may monitor network device 206 and/or NMS 212 for any rollback requests that call for the retrieval of one of set of configuration files 120. While monitoring network device 206 and/or NMS 212 in this way, receiving module 110 may detect and/or identify rollback request 216. Once rollback request 216 has been detected and/or identified, storage module 106 may search rollback request 216 for a configuration identifier that uniquely identifies the configuration file being sought from NMS 212. For example, upon searching rollback request 216, storage module 106 may find and/or locate configuration identifier 142 within rollback request 216.

In response, storage module 106 may search database 138 for the identity of the configuration file that corresponds to and/or is represented by configuration identifier 142. In other words, storage module 106 may look up the configuration file listed as corresponding to configuration identifier 142 within database 138. For example, storage device 106 may query database 138 for the configuration file to which configuration identifier 142 is assigned. Upon doing so, storage module 106 may discover and/or determine that configuration file 122 corresponds to and/or is represented by configuration identifier 142.

In some examples, receiving module 110 may receive rollback request 216 via a Command Line Interface (CLI). For example, a network administrator may detect a deficiency and/or regression within a newly implemented and/or applied configuration within network 204. In response to this detection, the network administrator may enter and/or provide user input to NMS 212 via the CLI. This user input may identify and/or include the configuration identifier for a specific configuration file that represents and/or captures an earlier, trusted configuration maintained by NMS 212. As a result, this user input may effectively direct and/or cause NMS 212 to restore one or more of the network devices within network 204 to that earlier, trusted configuration as represented and/or captured by that configuration file.

In some examples, NMS 212 may return the current rollback number that corresponds to the configuration file sought by the network administrator. For example, rather than automatically providing the configuration file for restoration in response to the configuration number, configuration module 104 and/or restoration module 112 may return the current rollback number that corresponds to the configuration file. In this example, the network administrator may then select and/or enter that rollback number via the CLI as corresponding to the configuration sought to be restored to network 204.

As an example in connection with FIG. 4, receiving module 110 may receive a rollback request from network device 206. Storage module 110 may then search the rollback request for the corresponding configuration identifier. During this search, storage module 110 may find and/or locate the "re0-123456-60" configuration identifier within rollback request 216. Upon doing so, storage module 110 may discover and/or determine that the "re0-123456-60"

configuration identifier references the "juniper.conf.0.gz" configuration file. Storage module 110 may then be able to retrieve the "juniper.conf.0.gz" configuration file from its storage location for distribution to network device 206.

In some examples, rollback request 216 may include and/or contain a single configuration identifier. However, in other examples, rollback request 216 may include and/or contain multiple configuration identifiers. As will be described in greater detail below, if rollback request 216 includes multiple configuration identifiers, NMS 212 may be able to facilitate rolling back the configuration of network device 206 in a more efficient way and/or without necessarily providing a complete configuration file to network device 206.

FIG. 5 illustrates an exemplary system 500 for efficient configuration file management and distribution by NMSes. As illustrated in FIG. 5, system 500 may represent an embodiment in which NMS 212 includes a physical device that is separate and distinct from network device 206. In one example, if network device 206 is currently operating under the configuration represented by the "juniper.conf.4.gz" configuration file, rollback request 216 may include and/or contain the "re0-123456-62" and "re0-123456-64" configuration identifiers. In this example, in response to rollback request 216, configuration module 104 and/or restoration module 112 may determine and/or extrapolate certain differences between the configuration represented by the "juniper.conf.2.gz" configuration file and the configuration represented by the "juniper.conf.4.gz" configuration file.

These differences may constitute and/or represent the changes necessary to revert and/or return network device 206 from the configuration represented by the "juniper.conf.4.gz" configuration file to the configuration represented by the "juniper.conf.2.gz" configuration file. In one example, configuration module 104 and/or restoration module 112 may then generate a delta file 540 that represents and/or captures the differential between the configuration represented by the "juniper.conf.2.gz" configuration file and the configuration represented by the "juniper.conf.4.gz" configuration file. For example, delta file 540 may include and/or represent a system log of changes that, when applied to network device 206, would effectively revert and/or return network device 206 from its current configuration to the configuration represented by the "juniper.conf.2.gz" configuration file. Additionally or alternatively, delta file 540 may effectuate this rollback by directing and/or causing network device 206 to undo certain features that were added to its configuration since the creation of the "juniper.conf.2.gz" configuration file.

Returning to FIG. 3, at step 350 one or more of the systems described herein may restore, in response to the rollback request, the network device to the specific configuration based at least in part on the configuration file stored among the set of configuration files available via the NMS. For example, restoration module 112 may, as part of network device 206 and/or NMS 212 in FIG. 2, restore network device 206 to the specific configuration based at least in part on configuration file 122 stored among set of configuration files 120 available via NMS 212. In other words, network device 206 may return and/or revert to the specific configuration represented and/or captured by configuration file 122.

The systems described herein may perform step 350 in a variety of ways and/or contexts. In some examples, restoration module 112 may provide and/or deliver configuration file 122 to network device 206 to enable network device 206 to return and/or revert to the specific configuration. In such examples, configuration file 122 may be formatted in the desired and/or requested format from the CLI/XML-Application Programming Interface (API) session. As configuration file 122 arrives at network device 206, restoration module 112 may direct and/or cause network device 206 to load and/or apply configuration file 122 to network device 206. By doing so, restoration module 112 may effectively reload, restore, and/or regenerate the specific configuration on network device 206.

As described above in connection with FIGS. 1-5, an NMS may simplify the complexity and/or ambiguity that is often involved in the conventional management, retrieval, and/or distribution of configuration files. For example, an NMS may assign static configuration identifiers to configuration files that are backed up to its backup store. As a result, a network administrator may be able to select a specific configuration file by the corresponding static configuration identifier, as opposed to the current rollback slot or number of that configuration file. By doing so, the network administrator may no longer need to track the configuration files across the rollback slots as new files are added.

As a specific example, a first network administrator may apply and/or commit a first configuration to a campus network. In this example, a second network administrator may subsequently apply and/or commit a second configuration to the campus network. If the first network administrator wants to roll back the campus network from the second configuration to the first configuration, the first network administrator may enter and/or provide the configuration identifier that represents the first configuration into a CLI of the NMS that manages the backup of configurations for the campus network. In response, the NMS may provide the first network administrator with a file that facilitates restoring the first configuration to the campus network. The NMS may also return the actual rollback number corresponding to the file that facilitates restoring the first configuration to the campus network. Additionally or alternatively, the NMS may automatically direct and/or cause the campus network to revert and/or return to the first configuration.

Figure 6:
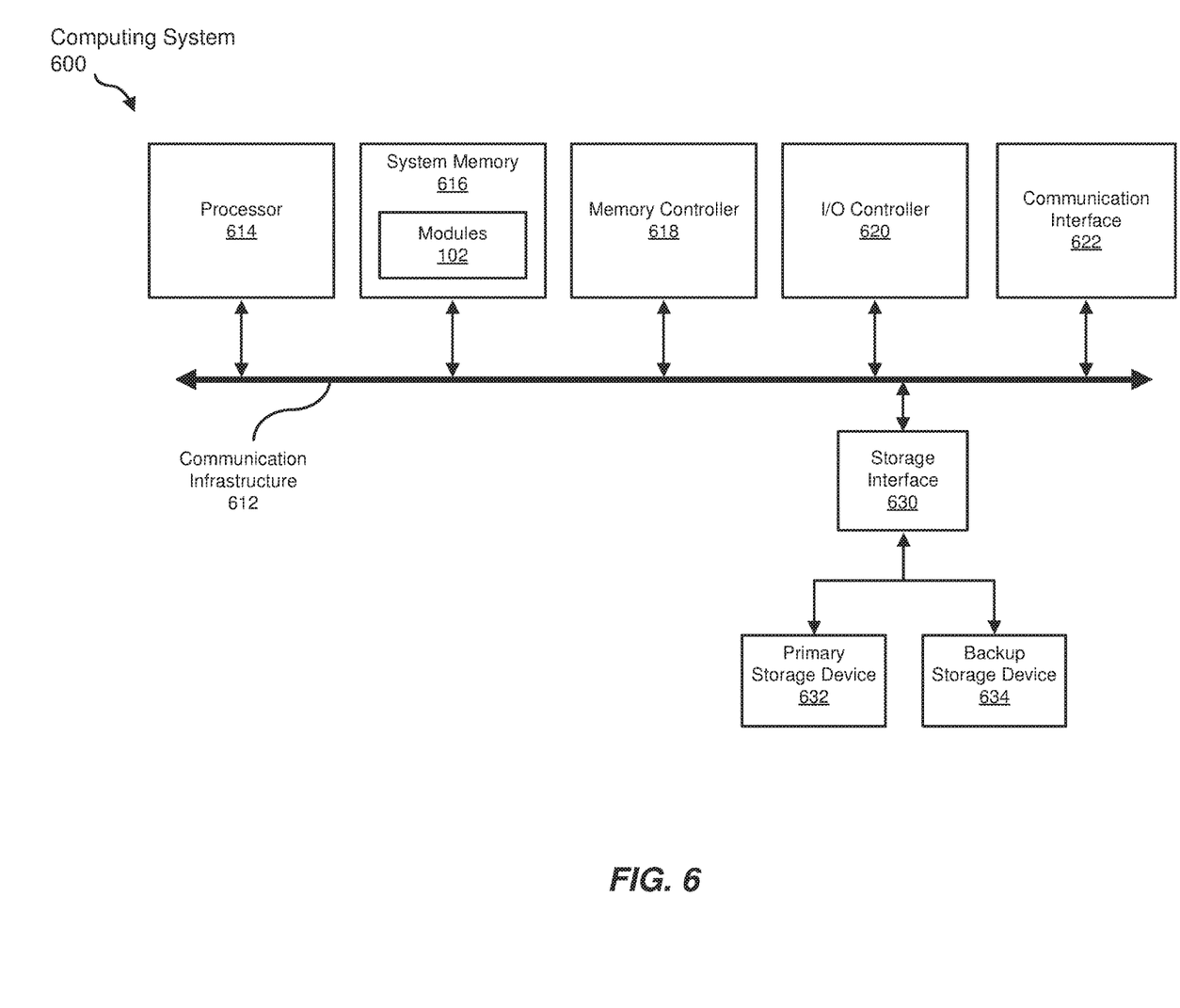
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC) a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
generating a configuration file that represents a specific configuration of a network device included in a network;
storing the configuration file that represents the specific configuration of the network device among a set of configuration files available via a Network Management System (NMS);
assigning, to the configuration file via the NMS, a configuration identifier that uniquely identifies the configuration file among the set of configuration files available via the NMS, wherein:
the NMS maintains a static 1-to-1 mapping between the configuration identifier and the configuration file; and
the NMS assigns different unique configuration identifiers to each configuration file among the set of configuration files, wherein each configuration file stores a complete configuration of the network device at a specific time, such that an addition of a different configuration file does not affect the static 1-to-1 mapping between the configuration identifier and the configuration file;
receiving, via the NMS, a rollback request to restore the network device to the specific configuration based at least in part on:

querying the rollback request for configuration identifiers;
locating the configuration identifier assigned to the configuration file within the rollback request; and
querying the static 1-to-1 mapping using the located configuration identifier; and
in response to receiving the rollback request, restoring the network device to the specific configuration based at least in part on:
identifying, from the query of the static 1-to-1 mapping using the configuration identifier, the configuration file stored among the set of configuration files available via the NMS; and
restoring the network device using the identified configuration file.

2. The method of claim 1, wherein storing the configuration file among the set of configuration files available via the NMS comprises at least one of:
storing the configuration file on the network device; or
storing the configuration file on a remote device accessible via the NMS.

3. The method of claim 1, further comprising at least one of:
advertising the configuration identifier to the network device; or
advertising the configuration identifier to at least one additional device.

4. The method of claim 1, wherein receiving the rollback request comprises receiving the rollback request via a Command Line Interface (CLI).

5. The method of claim 1, wherein the rollback request includes the configuration identifier.

6. The method of claim 1, wherein restoring the network device to the specific configuration comprises providing the configuration file to the network device to enable the network device to revert to the specific configuration.

7. The method of claim 1, wherein the rollback request includes:
the configuration identifier; and
an additional configuration identifier assigned to an additional configuration file included in the set of configuration files available via the NMS;
further comprising generating a delta file that captures a differential between the specific configuration represented by the configuration file and an additional configuration represented by the additional configuration file; and
wherein restoring the network device to the specific configuration comprises applying the delta file to the network device to revert to the specific configuration.

8. The method of claim 7, wherein:
the network device is currently operating under the additional configuration; and
applying the delta file to the network device comprises reverting the network device from the additional configuration to the specific configuration by undoing one or more features captured in the delta file.

9. The method of claim 1, further comprising copying the configuration file along with the configuration identifier to a database associated with the network device.

10. The method of claim 9, further comprising querying the database for the configuration file to which the configuration identifier is assigned.

11. A system comprising:
a configuration module, stored in memory, that generates a configuration file that represents a specific configuration of a network device included in a network;
a storage module, stored in memory, that stores the configuration file that represents the specific configuration of the network device among a set of configuration files available via a Network Management System (NMS);
an assignment module, stored in memory, that assigns, to the configuration file via the NMS, a configuration identifier that uniquely identifies the configuration file among the set of configuration files available via the NMS, wherein:
the NMS maintains a static 1-to-1 mapping between the configuration identifier and the configuration file; and
the NMS assigns different unique configuration identifiers to each configuration file among the set of configuration files, wherein each configuration file stores a complete configuration of the network device at a specific time, such that an addition of a different configuration file does not affect the static 1-to-1 mapping between the configuration identifier and the configuration file;
a receiving module, stored in memory, that receives, via the NMS, a rollback request to restore the network device to the specific configuration based at least in part on:
querying the rollback request for configuration identifiers;
locating the configuration identifier assigned to the configuration file within the rollback request; and
querying the static 1-to-1 mapping using the located configuration identifier;
a restoration module, stored in memory, that restores, in response to the rollback request, the network device to the specific configuration based at least in part on:
identifying, from the query of the static 1-to-1 mapping using the configuration identifier, the configuration file stored among the set of configuration files available via the NMS; and
restoring the network device using the identified configuration file; and
at least one physical processor that executes the configuration module, the storage module, the assignment module, the receiving module, and the restoration module.

12. The system of claim 11, wherein the storage module:
stores the configuration file on the network device; or
stores the configuration file on a remote device accessible via the NMS.

13. The system of claim 11, further comprising an advertising module, stored in memory, that:
advertises the configuration identifier to the network device; or
advertises the configuration identifier to at least one additional device.

14. The system of claim 11, wherein the receiving module receives the rollback request via a Command Line Interface (CLI).

15. The system of claim 11, wherein the rollback request includes the configuration identifier.

16. The system of claim 11, wherein, to restore the network device to the specific configuration, the restoration module provides the configuration file to the network device to enable the network device to revert to the specific configuration.

17. The system of claim 11, wherein:
the rollback request includes:
the configuration identifier; and an additional configuration identifier assigned to an additional configuration file included in the set of configuration files available via the NMS;

the configuration module generates a delta file that captures a differential between the specific configuration represented by the configuration file and an additional configuration represented by the additional configuration file; and the restoration module applies the delta file to the network device to revert to the specific configuration.

18. The system of claim 17, wherein:

the network device is currently operating under the additional configuration; and the restoration module reverts the network device from the additional configuration to the specific configuration by undoing one or more features captured in the delta file.

19. The system of claim 11, further comprising copying the configuration file along with the configuration identifier to a database associated with the network device.

20. A non-transitory computer-readable medium comprising one or more computer-readable instructions that, when executed by at least one processor of a computing device, cause the computing device to:

generate a configuration file that represents a specific configuration of a network device included in a network;

store the configuration file that represents the specific configuration of the network device among a set of configuration files available via a Network Management System (NMS);

assign, to the configuration file via the NMS, a configuration identifier that uniquely identifies the configuration file among the set of configuration files available via the NMS, wherein:

the NMS maintains a static 1-to-1 mapping between the configuration identifier and the configuration file; and the NMS assigns different unique configuration identifiers to each configuration file among the set of configuration files, wherein each configuration file stores a complete configuration of the network device at a specific time, such that an addition of a different configuration file does not affect the static 1-to-1 mapping between the configuration identifier and the configuration file;

receive, via the NMS, a rollback request to restore the network device to the specific configuration based at least in part on:

querying the rollback request for configuration identifiers;

locating the configuration identifier assigned to the configuration file within the rollback request; and querying the static 1-to-1 mapping using the located configuration identifier; and restore, in response to receiving the rollback request, the network device to the specific configuration based at least in part on:

identifying, from the query of the static 1-to-1 mapping using the configuration identifier, the configuration file stored among the set of configuration files available via the NMS; and restoring the network device using the identified configuration file.

* * * * *